United States Patent [19]

Seki et al.

[11] Patent Number: 4,998,196

[45] Date of Patent: Mar. 5, 1991

[54] METHOD OF CREATING NC DATA FOR TURNING

[75] Inventors: Masaki Seki; Takashi Takegahara, both of Tokyo; Masatoshi Nakajima, Yamanashi, all of Japan

[73] Assignee: Fanuc Ltd, Minamitsuru, Japan

[21] Appl. No.: 348,037

[22] PCT Filed: Sep. 8, 1988

[86] PCT No.: PCT/JP88/00903

§ 371 Date: Apr. 25, 1989

§ 102(e) Date: Apr. 25, 1989

[87] PCT Pub. No.: WO89/02340

PCT Pub. Date: Mar. 23, 1989

[30] Foreign Application Priority Data

Sep. 10, 1987 [JP] Japan .................. 62-225382

[51] Int. Cl.⁵ .................................... G05B 19/403
[52] U.S. Cl. ........................... 364/191; 364/474.21; 364/474.25; 364/474.32
[58] Field of Search .............. 364/138, 167.01, 191, 364/474.11, 474.2, 474.21, 474.25, 474.28, 474.32, 474.34

[56] References Cited

U.S. PATENT DOCUMENTS 4,587,608 5/1986 Kishi et al. .................. 364/191

Primary Examiner—Jerry Smith
Assistant Examiner—Paul Gordon
Attorney, Agent, or Firm—Staas & Halsey

[57] ABSTRACT

A method of creating NC data including storing various approach/withdrawal patterns in dependence upon a particular zone in which a turret index point/tool exchange position ($P_T$) is present, the zone being one among zones ($ZN_1$–$ZN_3$) defined by horizontal and vertical axes passing through a point (Q) specified by a safe position coordinate ($Z_S$) in a longitudinal direction of a workpiece (WK) and a safe position coordinate ($X_S$) in a direction perpendicular to the longitudinal direction, and in dependence upon a plane to which a cutting starting/end point ($P_S$) belongs, the plane being one of a plane (LPS) in the longitudinal direction of the workpiece and a plane (TPS) perpendicular to the longitudinal direction belongs. A predetermined pattern is selected from among the stored approach/withdrawal patterns based on the zone to which the turret index point ($P_T$) actually belongs and the plane to which the cutting starting/end point ($P_S$) actually belongs. NC data for approach and NC data for withdrawal are created using the selected pattern.

5 Claims, 6 Drawing Sheets

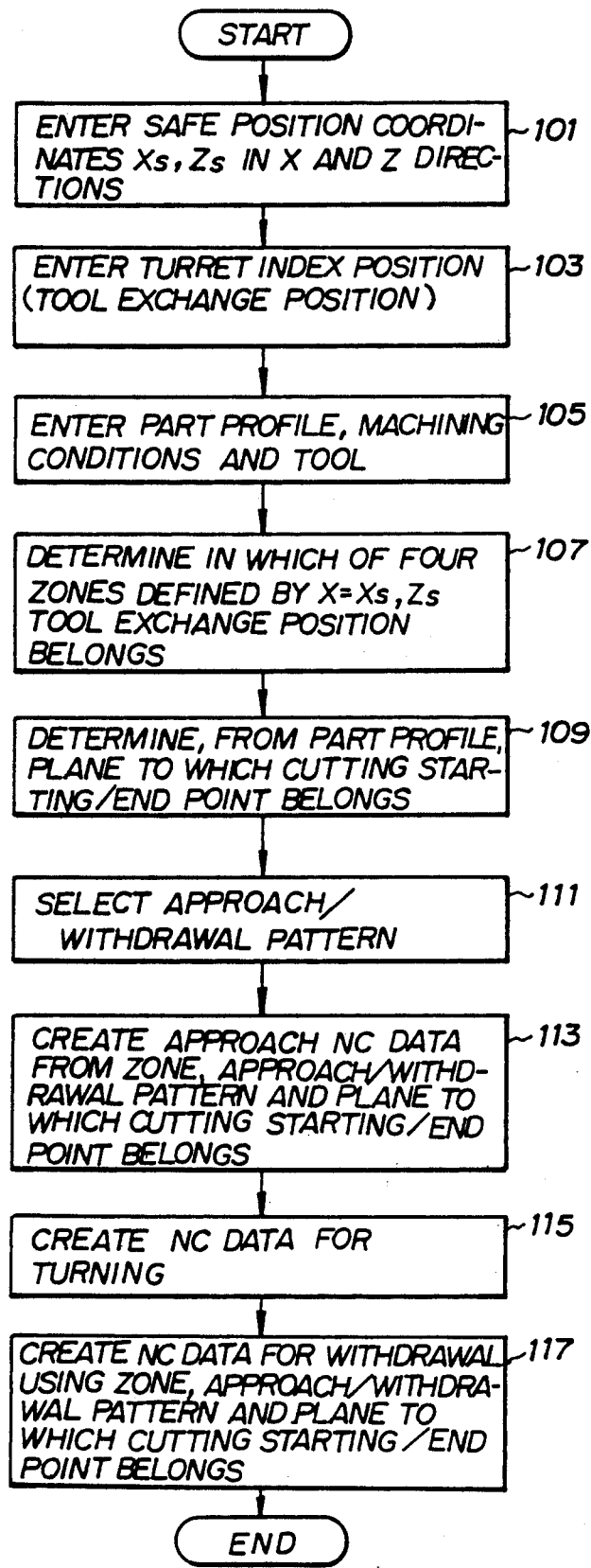

METHOD OF CREATING NC DATA FOR TURNING

DESCRIPTION

1. Technical Field

This invention relates to a method of creating NC data for turning and, more particularly, to an NC data creation method well, suited for creating approach and withdrawal NC data for turning.

2. Background Art

In turning performed by a lathe, as shown in FIG. 10, a desired tool TL is selected at an index position (turret index point) $P_T$ of a turret TR. The tool is then made to approach a cutting starting point $P_A$ (see the path indicated by the black arrows). The tool is subsequently moved along a commanded path at the completion of the approach operation so as to machine a workpiece WK. The tool is then withdrawn from a cutting end point (which coincides with the cutting starting point) $P_A$ to the turret index position $P_T$ at the completion of machining performed by the tool (see the white arrows), thereby ending the turning cycle for one process. Thereafter, the tool for the next process is selected and the same operations are repeated, whereby a desired part profile PFG (see the dashed line) is eventually obtained. In FIG. 10, CHK denotes a chuck. The cutting starting/end point $P_A$ is a point located at a distance $\Delta d$ from a starting point $P_S$ on the part profile PFG.

With regard to the approach path among the tool paths traversed in such a turning operation, there is a case (i) where a direct approach is made by rapid-traverse positioning using the machining starting point (turret index point) $P_T$ and the cutting starting point $P_A$ as the respective starting and end points (see a first approach path $PTA_1$), and a case (ii) where a suitable transit point (e.g., a point $P_{AA}$ or $P_{AS}$) is entered and this point is traversed (see second and third paths $PTA_2$, $PTA_3$). The same is true for the withdrawal path. It should be noted that the cutting path is automatically decided by entering the part profile.

When the direct approach or withdrawal of case (i) is made, the approach and withdrawal distances can be shortened but a problem which arises is that the tool may be obstructed by obstacles such as a stationary portion of the machine, the workpiece, etc.

When approach or withdrawal is made so as to traverse the designated transit point as in case (ii), it can be arranged so that the tool will not interfere with the workpiece, but the transit point for the approach or withdrawal must be designated each time the approach or withdrawal is performed. This is a troublesome operation.

SUMMARY OF THE INVENTION

Accordingly, an object of the present invention is to provide a method of creating NC data for turning, wherein an approach path and withdrawal path which will not cause interference with an obstacle can be decided without entering a transit point.

In a method of creating NC data for turning according to the present invention, various approach/withdrawal patterns are registered in dependence upon a particular zone in which a turret index point is present, the zone being one among zones defined by horizontal and vertical axes passing through a point specified by a safe position coordinate in a longitudinal direction of a workpiece and a safe position coordinate in a direction perpendicular to the longitudinal direction, and in dependence upon a plane to which the cutting starting-/end point belongs, the plane being one of a plane in the longitudinal direction of the workpiece and a plane perpendicular to the longitudinal direction. A predetermined pattern is selected from among the registered approach/withdrawal patterns based on the zone to which the turret index point actually belongs and the plane to which the cutting starting/end point actually belongs. NC data for approach and NC data for withdrawal are created using the selected pattern.

BRIEF DESCRIPTION OF THE DRAWINGS

FIGS. 3(a) through 8(c) are views of approach/withdrawal patterns;

FIG. 9 is a flowchart of processing according to the invention; and

DESCRIPTION OF THE PREFERRED EMBODIMENT

Figure 1:
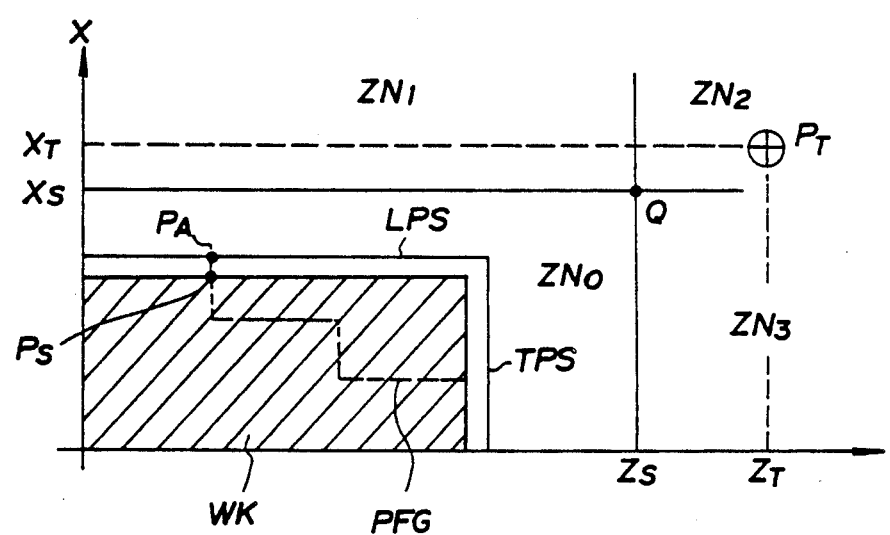
FIG. 1 is a view for describing the principle of the NC data creation method of the present invention.

FIG. 1 is a view for describing the principle of the NC data creation method of the present invention. WK represents a workpiece, PFG (the dashed line) a part profile, $Z_S$ a safe position coordinate in the longitudinal direction of the workpiece, $X_S$ a safe position coordinate in a direction perpendicular to the longitudinal direction of the workpiece, $X_A$ a cutting starting/end point, $P_T$ a turret index position, $ZN_0$–$ZN_3$ zones, LPS a plane (longitudinal plane) parallel to the longitudinal direction of the workpiece, and TPS a plane parallel to the end face of the workpiece.

Various approach/withdrawal patterns are registered in dependence upon a particular zone in which the turret index point $P_T$ is present. The zone is one of the zones $ZN_1$–$ZN_3$ defined by horizontal and vertical axes passing through a point Q ($Z_S$,$X_S$) specified by the safe position coordinate $Z_S$ in the longitudinal direction of the workpiece and the safe position coordinate $X_S 1$ in the direction perpendicular to the longitudinal direction. The zone is selected in dependence upon a plane to which the cutting starting end/point $P_A$ belongs, the plane being one of the plane (longitudinal plane) LPS in the longitudinal direction of the workpiece and the plane (end face) TPS perpendicular to the longitudinal direction. A predetermined pattern is selected from among the registered approach/withdrawal patterns based on a combination of the zone $ZN_2$ to which the turret index point $P_T$ actually belongs and the plane LPS to which the cutting starting/end point $P_A$ actually belongs. NC data for approach and NC data for withdrawal are created using the selected pattern.

Figure 2:
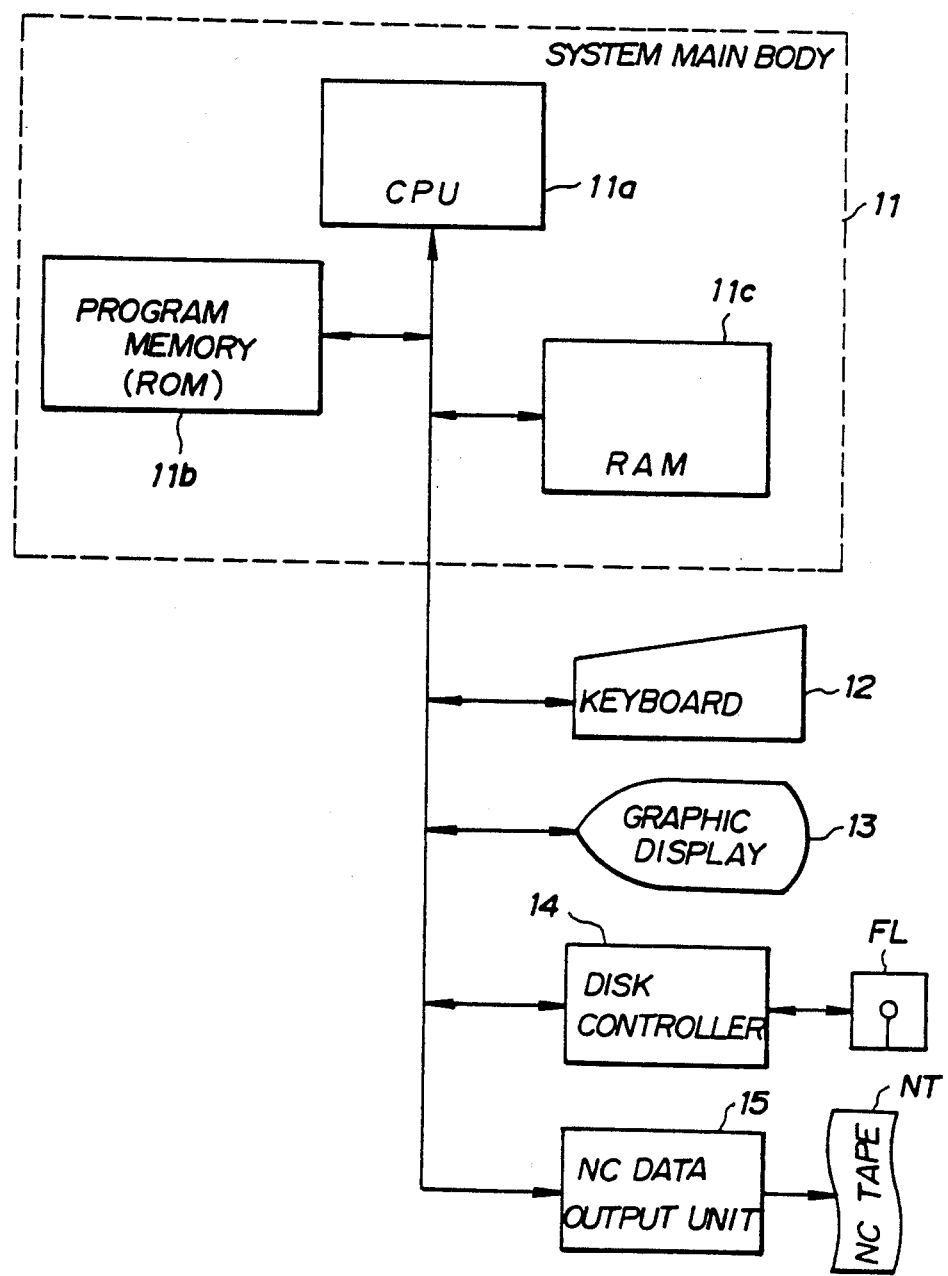
FIG. 2 is a block diagram of a system for executing the method of the invention.

FIG. 2 is a block diagram of an automatic programming system for practicing the method of creating NC data for turning according to the present invention. Numeral 11 denotes the main body of the system, which includes a processor (CPU) 11a, a program memory (ROM) 11b for storing a loading program and the like, and a RAM 11c which stores a system program for NC data creation read in from a floppy FL, approach and withdrawal patterns, as well as the results of processing, etc.

Numeral 12 denotes a keyboard, 13 a graphic display unit, 14 a disk controller, and 15 an NC data output unit for outputting created NC data to an external storage medium (NC tape). The floppy FL stores the system program for creating NC data, the approach/withdrawal patterns, etc.

FIGS. 3(a) through 8(c), which are views for describing the approach/withdrawal patterns, show six respective cases in conformance with the turret index $P_T$ and cutting starting/end point $P_A$; three types of patterns are set for each case. More specifically, three approach/withdrawal patterns are set and registered on the floppy FL, as shown in FIGS. 3(a) through 8(c). These patterns represent respective ones of six cases for combinations of the area in which the turret index position $P_T$ resides. The area is one of the areas $ZN_1$–$ZN_3$ defined by horizontal and vertical axes passing through the point Q specified by the safe position coordinate $Z_S$ in the longitudinal direction of the workpiece and the safe position coordinate $X_S$ in the direction perpendicular to the longitudinal direction, and the plane (longitudinal plane) LPS in the longitudinal direction of the workpiece or the plane (end face) TPS perpendicular to the longitudinal direction to which the cutting starting/end point $P_A$ belongs.

Figure 3A:
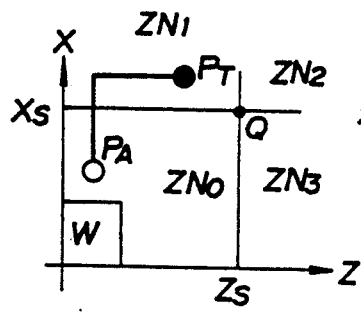
Figure 3B:
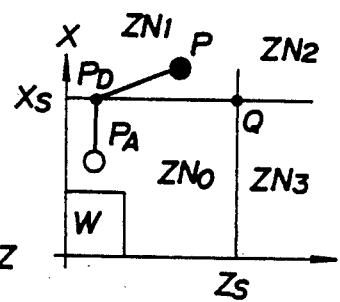
Figure 3C:
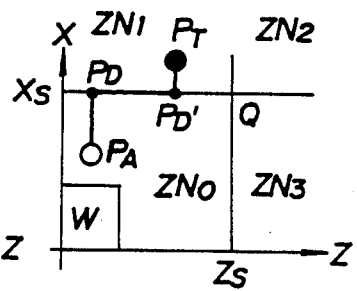

FIGS. 3(a)–3(c) are for a case where the turret index point $P_T$ belongs to the first zone $ZN_1$ and the cutting starting/end point $P_A$ belongs to the longitudinal plane LPS. FIG. 3(a) shows a pattern which, in an approach operation, is for moving the tool horizontally, i.e., in the −Z direction, at rapid-traverse from the turret index point $P_T$ to a point just above the cutting starting/end point $P_A$. The tool is subsequently lowered to the cutting starting/end point $P_A$. In a withdrawal operation, FIG. 3(a) is for withdrawing the tool in the direction opposite that of the approach. FIG. 3(b) shows a pattern which, in an approach operation, is for moving the tool at rapid-traverse simultaneously along two axes from the turret index point $P_T$ to a boundary point $P_D$, of a danger zone $ZN_0$, just above the cutting starting/end point $P_A$. The tool is subsequently lowered to the cutting starting/end point $P_A$. In withdrawal operation, FIG. 3(b) is for withdrawing the tool in the direction opposite that of the approach. FIG. 3(c) shows a pattern which, in an approach operation, is for lowering the tool at rapid-traverse from the turret index point $P_T$ to a boundary point $P_D'$ of the danger zone $ZN_0$, then moving the tool at rapid-traverse to a boundary point $P_D$ along the boundary line. The tool is subsequently lowered to the cutting starting/end point $P_A$. In a withdrawal operation, FIG. 3(c) is for withdrawing the tool in the direction opposite that of the approach.

Figure 4A:
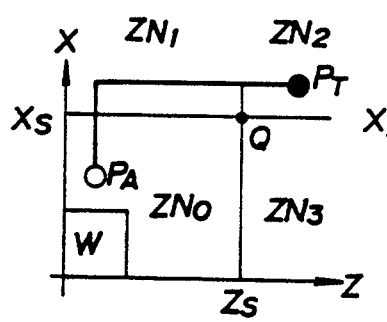
Figure 4B:
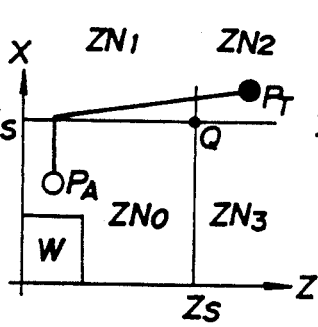
Figure 4C:
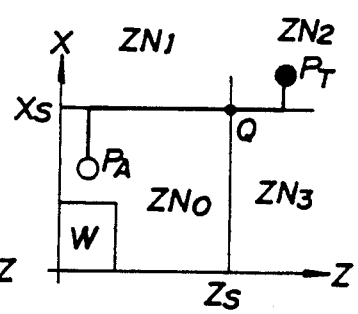
Figure 5A:
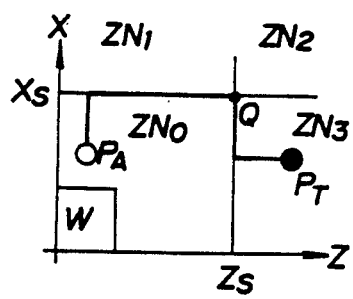
Figure 5B:
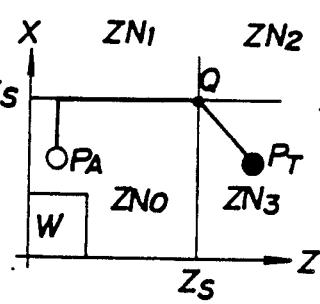
Figure 5C:
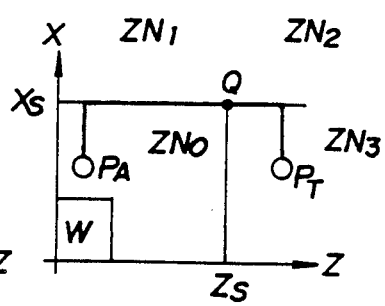
Figures 6A, 6B, 6C:
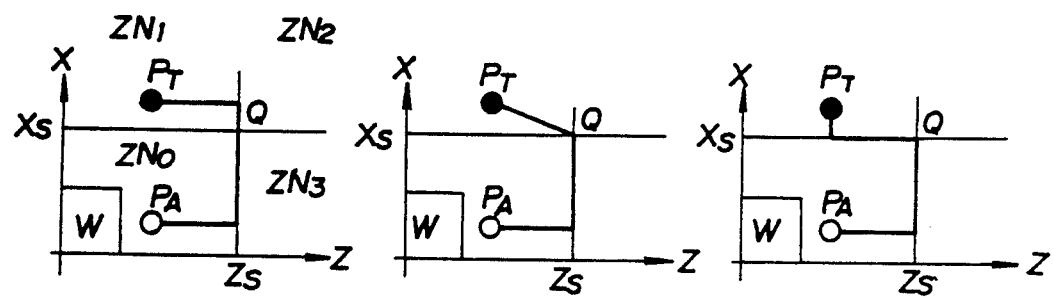
Figures 7A, 7B, 7C:
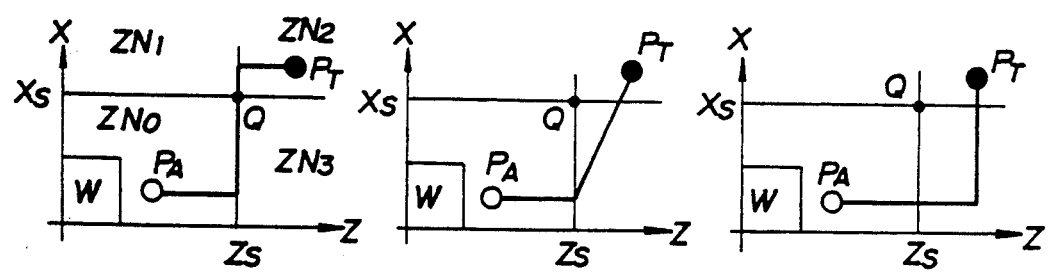
Figures 8A, 8B, 8C:
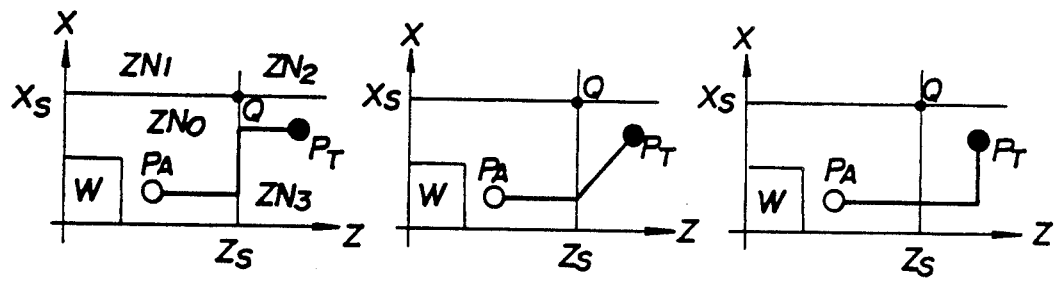
Figure 10:
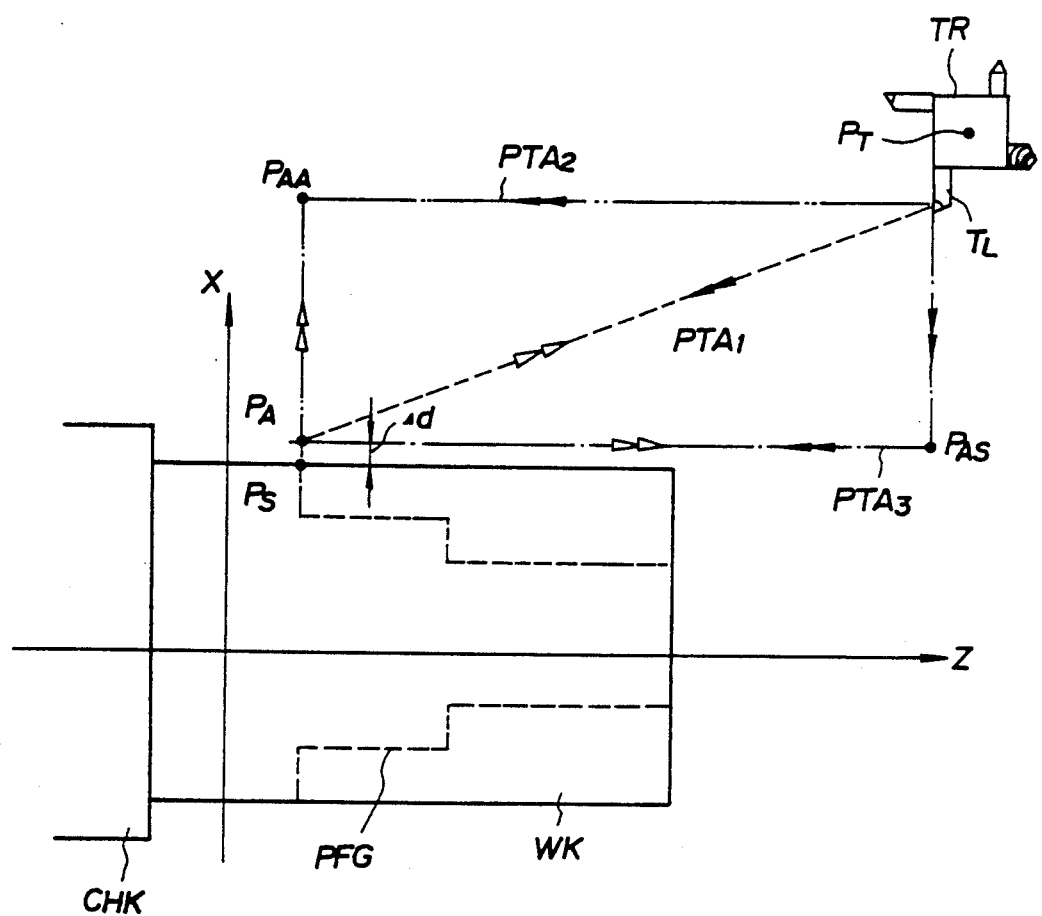
FIG. 10 is a view for describing paths used in a lathe.

FIGS. 4(a)–4(c) are a case where the turret index point $P_T$ belongs to the second zone $ZN_2$ and the cutting starting/end point $P_A$ belongs to the longitudinal plane LPS. FIGS. 5(a)–5(c) are for a case where the turret index point $P_T$ belongs to the third zone $ZN_3$ and the cutting starting/end point $P_A$ belongs to the longitudinal plane LPS. FIGS. 6(a)–6(c) are for a case where the turret index point $P_T$ belongs to the first zone $ZN_1$ and the cutting starting/end point $P_A$, belongs to the end face plane TPS. FIGS. 7(a)–7(c) are for a case where the current index point $P_T$ belongs to the second zone $ZN_2$ and the cutting starting/end point $P_A$ belongs to the end face plane TPS. FIGS. 8(a)–8(c) are for a case where the turret index point $P_T$ belongs to the third zone $ZN_3$ and the cutting starting/end point $P_A$ belongs to the end face plane TPS. Three approach/withdrawal patterns are set for the FIGS. 4(a) through 8(c), just as in the case of FIGS. 3(a)–3(c) and these patterns are registered on the floppy FL.

FIG. 9 is a flowchart of processing according to the present invention. The method of creating NC data according to the present invention will now be described in accordance with this flowchart. It is assumed that the system program, the approach/withdrawal data and other data have already been transferred to and stored in the RAM 11c from the floppy FL under the control of the loading program stored in the ROM 11b.

In response to start of operation for creating NC data for turning, the graphic display unit 13 displays a prompting screen calling for the safe position coordinates in the Z direction (longitudinal direction of the workpiece) and X direction. Accordingly, the safe position coordinates $Z_S$, $X_S$ (see FIG. 1) along the respective axes are entered from the keyboard 12 or the like (step 101).

The safe position coordinates $Z_S$, $X_S$ mean that, in a case where the cutting starting/end point $P_A$ resides on the longitudinal plane LPS, the tool will not interfere with an obstacle even if the tool is moved vertically toward the cutting starting/end point $P_A$, or even if the tool is moved vertically away from the cutting starting/end point $P_A$, in the danger zone $ZN_0$ specified by $Z_S$, $X_S$. Further, in a case where the cutting starting/end point $P_A$ resides on the end face plane TPS, the tool will not interfere with an obstacle even if the tool is moved horizontally toward the cutting starting/end point $P_A$, or even if the tool is moved vertically away from the cutting starting/end point $P_A$, in the danger zone $ZN_0$.

At the completion of entry of the safe position, a prompt appears calling for the turret index position $P_T$ (step 103). Therefore, the coordinates $(Z_T, X_T)$ of the point are entered in the same manner (step 103).

Next, the part profile PFG, turning conditions and data indicative of the tool used are entered in the same manner as practiced in the prior art (step 105).

When the entry of the part profile and the like is completed, the processor considers the safe position coordinates $Z_S$, $X_S$ along the respective axes and the coordinates $Z_T$, $X_T$ of the turret index position $P_T$ to determine the zone to which the turret index position $P_T$ belongs (step 107), and determines, from the starting point $P_S$ of the part profile PFG, the plane to which the cutting starting/end point $P_A$ belongs (step 109). If the starting point $P_S$ of the part profile PFG resides on the longitudinal surface of the workpiece WK, the cutting starting/end point $P_A$ will lie at a position located a distance $\Delta d$ (already known) directly above the starting point $P_S$ and therefore will belong to the longitudinal plane LPS. If the starting point $P_S$ resides on the end face of the workpiece WK, the cutting starting/end point $P_A$ will lie at a position located a distance $\Delta d'$ (not shown) from the starting point $P_S$ in the horizontal direction and therefore will belong to the end face plane TPS.

Thereafter, the processor 11a causes the first, second and third approach/withdrawal patterns [e.g., FIGS. 3(a)–(c)] to be displayed in conformity with the combination of the area to which the turret index point $P_T$ belongs and the plane to which the cutting starting/end point $P_A$ belongs, as determined at steps 107, 109. Along which pattern the approach and withdrawal are to be made is entered (step 111). It should be noted that it is not essential to display the patterns.

Using the approach/withdrawal pattern entered at step 111, the coordinates $(Z_T, X_T)$ of the turret index point $P_T$, the coordinates $Z_S$, $X_S$ of the safe position and the coordinates of the cutting starting/end point $P_A$, the processor 11a automatically creates NC data for the approach (step 113), creates NC data for the cutting path using the part profile data, machining conditions, etc., after creation of the NC data for approach (step 115), and finally creates NC data for the withdrawal in the direction opposite that of the approach, after which processing is ended (step 117).

The foregoing description is rendered upon taking into consideration the plane to which the cutting starting/end point $P_A$ belongs, which point is located at the position a predetermined distance from the starting point $P_S$ of the part profile. However, it is permissible to adopt an arrangement in which the approach/withdrawal pattern is decided in a similar manner upon taking into consideration the plane to which the starting point $P_S$ belongs.

Further, the foregoing description pertains to an arrangement in which three approach/withdrawal patterns exist for each of six cases conforming to the turret index position and the cutting starting/end point. However, the invention is not limited to this arrangement, for it will suffice if only one pattern is provided for each case.

In accordance with the present invention, various approach and withdrawal patterns are registered in dependence upon a combination of a particular zone in which a turret index point is present, the zone being one among zones defined by horizontal and vertical axes passing through a predetermined point, and the longitudinal plane or end face plane to which the cutting starting/end point belongs. NC data for approach and NC data for withdrawal are created using a predetermined pattern from among the registered approach/withdrawal patterns based on the zone to which the turret index point actually belongs and the plane to which the cutting starting/end point actually belongs. As a result, it is possible to simply decide an approach path and withdrawal path which will not cause interference with an obstacle without deciding and entering transit points one at a time for the purpose of avoiding interference with the obstacle, as is required in the prior art.

We claim:

1. A method of creating NC data for a tool mounted in an automatic programming system, comprising:
    storing safe position coordinates along two orthogonal axes;
    storing a tool exchange position;
    storing a cutting starting/end point;
    storing a plurality of approach/withdrawal patterns, said patterns being based on said tool exchange position, said safe position coordinates and said cutting starting/end point;
    selecting a predetermined pattern from among said patterns based on said tool exchange position and said cutting starting/end point; and
    creating NC data for approach and NC data for withdrawal using said selected pattern.

2. A method of creating NC data for turning according to claim 1, further comprising the steps of:
    entering part profile data; and
    determining a plane to which said cutting starting/end point belongs based on said part profile data.

3. A method of creating NC data for turning according to claim 1, further comprising the steps of:
    storing two or more approach/withdrawal patterns said tool exchange position and said cutting starting/end point; and
    selecting one of said approach/withdrawal patterns based on said tool exchange position, said cutting starting/end point and said entered pattern selection data.

4. A method of creating NC data for turning according to claim 3, further comprising the step of:
    displaying two or more of said approach/withdrawal patterns based on said tool exchange position and said cutting starting/end point.

5. A method of creating NC data for turning according to claim 1, further comprises the substep of:
    storing said plurality of approach/withdrawal patterns including data specifying an approach to or withdrawal from said cutting starting/end point in vertical direction, and data specifying an approach to or withdrawal from said cutting starting/end point in a horizontal direction.

* * * * *